United States Patent [19]

Takahashi

[11] Patent Number: 5,410,591
[45] Date of Patent: Apr. 25, 1995

[54] PRIVATE BRANCH EXCHANGE WITH RESUMPTION OF INTERRUPTED COMMUNICATION

[75] Inventor: Takumi Takahashi, Yokohama, Japan

[73] Assignee: Canon Kabushiki Kaisha, Tokyo, Japan

[21] Appl. No.: 271,587

[22] Filed: Jul. 7, 1994

Related U.S. Application Data

[63] Continuation of Ser. No. 876,300, Apr. 30, 1992, abandoned.

[30] Foreign Application Priority Data

May 8, 1991 [JP] Japan ................... 3-131945
Jun. 6, 1991 [JP] Japan ................... 3-162105

[51] Int. Cl.⁶ .......................................... H04M 3/42
[52] U.S. Cl. .................................... 379/201; 379/210
[58] Field of Search ............. 379/201, 210, 211, 212, 379/162, 163, 62, 393

[56] References Cited

U.S. PATENT DOCUMENTS

| | | | |
|---|---|---|---|
| 4,755,985 | 7/1988 | Jayapalan et al. | 379/211 |
| 4,928,306 | 5/1990 | Biswas et al. | 379/201 |
| 5,008,930 | 4/1991 | Gawrys et al. | 379/210 |
| 5,023,868 | 6/1991 | Davidson et al. | 370/62 |
| 5,136,585 | 8/1992 | Nizamuddin et al. | 370/62 |
| 5,197,096 | 3/1993 | Sakuma et al. | 379/210 |
| 5,200,996 | 4/1993 | Beierle | 379/210 |

FOREIGN PATENT DOCUMENTS 1319391 12/1989 Japan .

OTHER PUBLICATIONS

Q.931 Recommendation Fascide V1.8,11; pp. 28-35, 79, 89, 180-183 undated.

*Primary Examiner*—James L. Dwyer
*Assistant Examiner*—Daniel S. Hunter
*Attorney, Agent, or Firm*—Fitzpatrick, Cella, Harper & Scinto

[57] ABSTRACT

If a communicating terminal connected to a communication line in a private branch exchange system is disconnected from the communication line, then, on the basis of call identifying information contained in an interruption message and in a resumption message, communication is put on hold and is subsequently resumed after the terminal is re-connected. This allows the terminal to be moved between the same or different communication lines while preventing loss of communication.

9 Claims, 15 Drawing Sheets

| TERMINAL NO. | CALL IDENTIFYING INFORMATION |
|---|---|
| T E 1 | 1 2 3 4 5 |
| T E 2 | 6 7 8 9 A |
| T E 3 | B C D E |
| ⋮ | ⋮ |

F I G. 2

| CALL IDENTIFYING INFORMATION | HELD-CALL NO. |
|---|---|
| 1 2 3 4 5 | H O L D 1 |
| B C D E | H O L D 2 |
| ⋮ | ⋮ |

F I G. 3

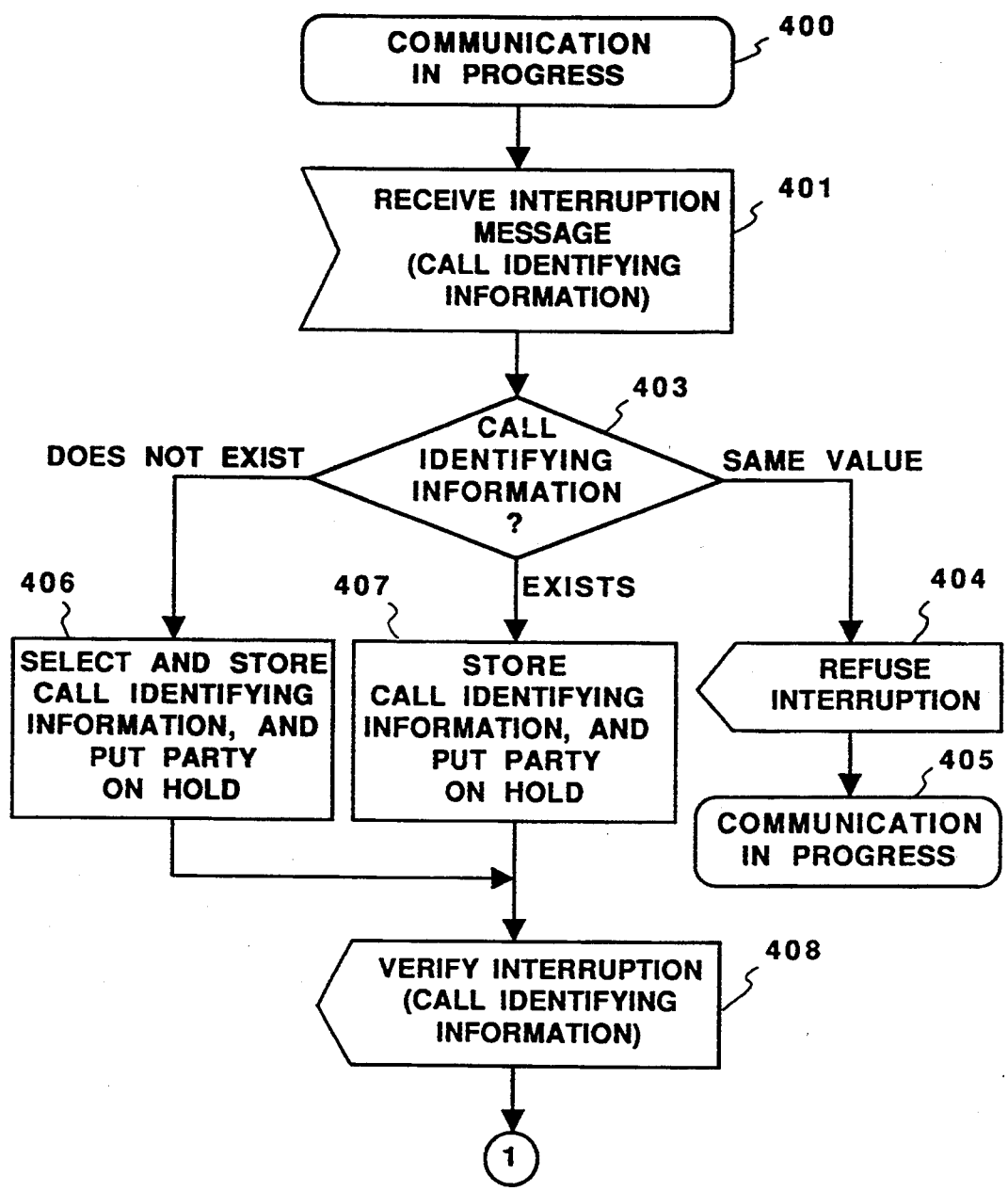
F I G. 9A

| CALL IDENTIFYING INFORMATION | HELD-CALL NO. |
|---|---|
| 1 2 3 4 5 | HOLD 1 |
| B C D E | HOLD 2 |
| ⋮ | ⋮ |

} FOR EVERY IDENTICAL INTERFACE (applies to rows HOLD 1 and HOLD 2)

FIG. 10

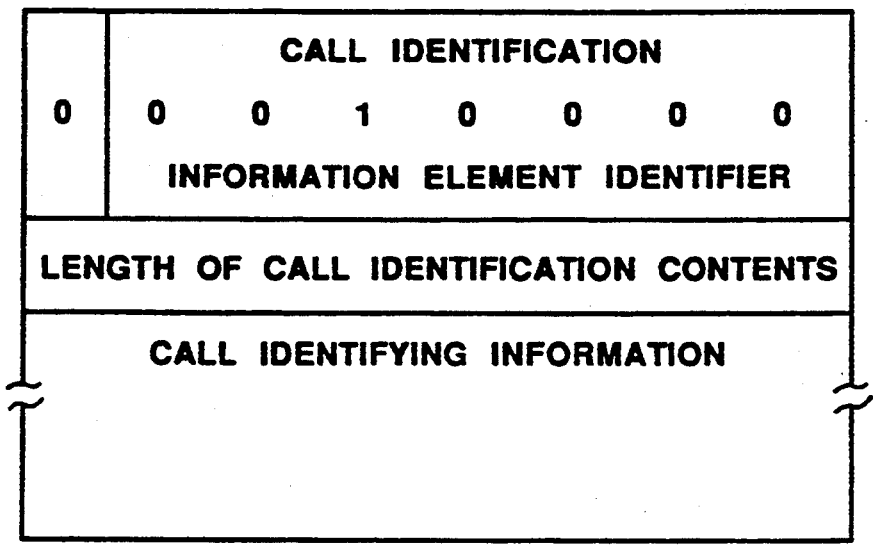
F I G. 11A
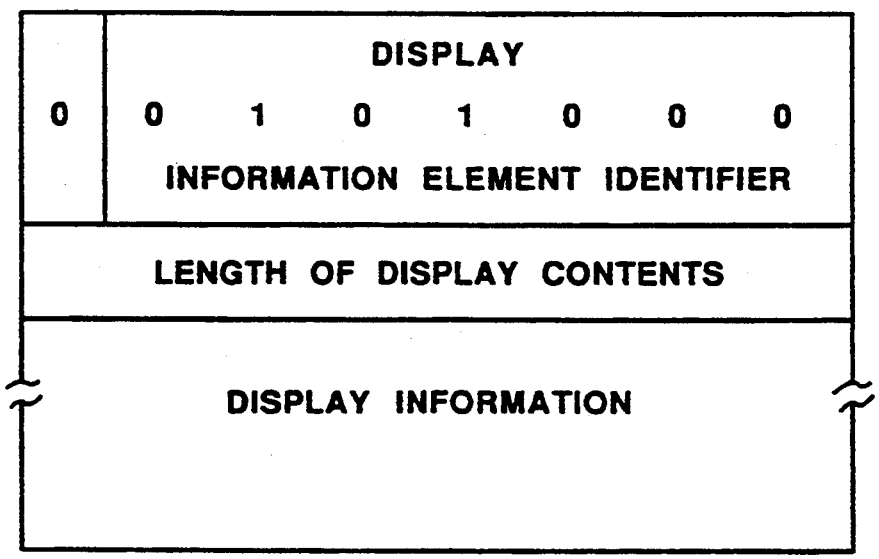
F I G. 11B

PRIVATE BRANCH EXCHANGE WITH RESUMPTION OF INTERRUPTED COMMUNICATION

This application is a continuation of application Ser. No. 07/876,300 filed Apr. 30, 1992 now abandoned.

BACKGROUND OF THE INVENTION

This invention relates to a private branch exchange system in which a terminal in the process of communicating can be moved between the same or different communication lines, wherein the communication is temporarily put on hold during this movement and then communication with the communicating party is resumed by the terminal after it has been moved.

In an ISDN standardized by the CCITT (International Telegraph and Telephone Consultative Committee), an information channel (B channel) and a signal channel (D channel) generally are completely isolated and therefore it is possible to exchange a wide variety of control signals. Accordingly, a diversity of services can be developed by the various types of control signals.

With an ISDN basic interface stipulated by the I-Series recommendations of the CCITT, a bus wiring system in which a maximum of eight terminals are capable of being connected to the same line of a four-wire system is employed in the S-point interface and T-point interface, which are the stipulated points of a user network interface. Accordingly, when a connector such as a modular jack or the like is used at the connection to the terminal, various terminals such as telephones and facsimile machines can be attached and detached at a single touch. Further, Recommendation Q.931 of the CCITT stipulates a service for moving devices during communication, which service uses an interruption message and a resumption message.

FIG. 12 illustrates a common network using such as ISDN. A private branch exchange (PBX) 801 is connected to a terminal 810 via an S-point interface and a digital communication line 821, and to an ISDN 830 via a T-point interface and a digital communication line 822. The S-point interface is of the point-multipoint type. The block 811 shown by the dashed line indicates that there is connector in the bus wiring but that no terminal has been connected to it.

FIG. 13 is a flowchart for describing an interruption/resumption sequence of the terminal 810 in FIG. 12, and FIG. 14 is a flowchart for describing an interruption/resumption sequence of the PBX 801 in FIG. 12. The service for moving a device in the process of communicating is started when the terminal 810 transmits an interruption message to the PBX 801.

In FIG. 13, the terminal 810 is in communication with the ISDN 830 via the PBX 801 at step 900. When, say, an interrupt key (not shown) is pressed at step 901 under these conditions, the terminal 810 transmits an interruption message through the PBX 801 at step 902 and assumes an interruption-request state at step 903. In this case, the terminal 810 transmits the interruption message, which contains a call identifying information element as an option. The call identifying information element is of the kind shown in FIG. 11.

Meanwhile, in FIG. 14, the PBX 801 is in a communicating state at step 1000. When the interruption message from the terminal 810 is received at step 1001, the PBX 801 attains an interruption-request state at step 1002. In a case where the call identifying information element of the kind shown in FIG. 11 is verified at step 1006, an interruption verification message is transmitted to the terminal 810 at step 1007. Then, at step 1008, the interrupt call and the call identifying information element are stored in memory and the call on the side communicating party is put on hold on the side of the ISDN 830 at step 1008. The ISDN 830 is notified of fact that the terminal 810 issued the interrupt, and the terminal 810 becomes idle at step 1009.

When the terminal 810 receives the interruption verification message from the PBX 801 at step 904 in FIG. 13, the terminal 810 becomes idle at step 907. Accordingly, the terminal 810 is capable of being moved, while the holding state is in effect, to the position of the block 811 indicated by the dashed line in FIG. 12.

In a case where the call identifying information element is insufficient, i.e., when the call identifying information is inadequate and does not possess sufficient information relating to resetting (step 1003), the PBX 801 transmits an interruption refusal message to the terminal 810 at step 1004 and a transition is made from the interruption-request state to a communication-in-progress state at step 1005, as shown in FIG. 14. For example, there are cases where the call identifying information duplicates a number utilized by another interrupt call. Upon receiving the interruption refusal message at step 905 in FIG. 13, the terminal 810 makes a transition from the interruption-request state to the communication-in-progress state at step 906.

When a resume key (not shown) on the terminal 810 that has been moved to the block 811 is pressed at step 908, the terminal 810 sends the PBX 801 (step 909) a resumption message containing a call identifying information element the same as that which prevailed when the interruption message was sent, and the terminal 810 makes a transition to a resumption-request state at step 910.

Upon receiving the resumption message at step 1010 in FIG. 14, the PBX 801 makes a transition to the resumption-request state at step 1011. The PBX then compares the call identifying information elements of the interruption message and resumption message and, if they coincide, releases the stored call identifying information elements at step 1015 and sends a resumption verification message to the terminal 810 at step 1016. At the communicating party is released from the holding state and the PBX makes a transition to the communicating state at step 1017. The resumption verification message contains a channel identifier which displays a message reading "Desired channel exists. Change to other channel not possible." in order to designate the S-point information channel at the moment of hold.

Upon receiving the resumption verification message at step 911 in FIG. 13, the terminal 810 undergoes a transition to the communicating mode at step 914. Accordingly, the communicating party is released from the holding state and communication again becomes possible between the ISDN 830 and the terminal 810.

When the call identifying information elements of the interruption message and resumption message do not coincide at step 1012 in FIG. 14, the PBX 801 sends a resumption refusal message to the terminal 810 at step 1013, the stored call identifying information elements are released, an interruption message is transmitted to the ISDN 830, and a transition is made to the idle state at step 1014. Upon receiving the resumption refusal message at step 912 in FIG. 13, the terminal 810 similarly makes a transition to the idle state at step 913.

In the conventional private branch exchange described above, movement of the device during communication can be carried out only in the same S-point interface. Consequently, in a case where the PBX 801 has a plurality of S-point interfaces, a problem 0 which arises is that communication will be lost if the terminal 810 is mistakenly connected to another digital communication line.

In addition, in the conventional private branch exchange described above, selection of the call identifying information is left to the individual moving the communication device. As a consequence, (1) the individual moving the communication device must not duplicate the call identifying information of another individual moving a communication device, and (2) if there is no call identifying information, the number of interruption calls is limited to one. These limitations can be an annoyance to the individual moving the communication device.

SUMMARY OF THE INVENTION

An object of the present invention to provide a private branch exchange system in which a terminal can be moved between the same or different communication lines and loss of important communication can be prevented.

Another object of the present invention is to provide a private branch exchange system in which the duplication of call identifying information when a terminal is moved can be prevented, and in which a limitation upon the number of calls capable of being interrupted simultaneously can be eliminated even if call identifying information is not entered.

According to the present invention, the foregoing object is attained by providing a private branch exchange system capable of interrupting and resuming of communication of a terminal with a transmission line, comprising selection means for selecting call identifying information in such a manner that a plurality of calls on hold will not exist with regard to the same call identifying information, means for storing the correspondence between the call identifying information selected by said selection means and a call on hold, means for informing the terminal of the call identifying information selected by said selection means, means for retrieving call identifying information having a value identical with that of the call identifying information designated by the terminal and means for resuming communication corresponding to the call on hold if the result of the retrieval is that the call identifying information having the identical value exists.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram for describing a terminal management table of a memory according to the first embodiment;

FIG. 3 is a diagram for describing a held-call management table of a memory according to the first embodiment;

FIGS. 9A and 9B are a flowchart illustrating an interruption/resumption sequence in the private branch exchange apparatus according to the second embodiment;

FIG. 10 is a diagram showing the construction of a held-call management table according to the second embodiment;

FIGS. 11A and 11B are is a diagram illustrating a call identifying information element and a display information element according to the second embodiment;

DESCRIPTION OF THE PREFERRED EMBODIMENTS

<First Embodiment>

Figure 1A:
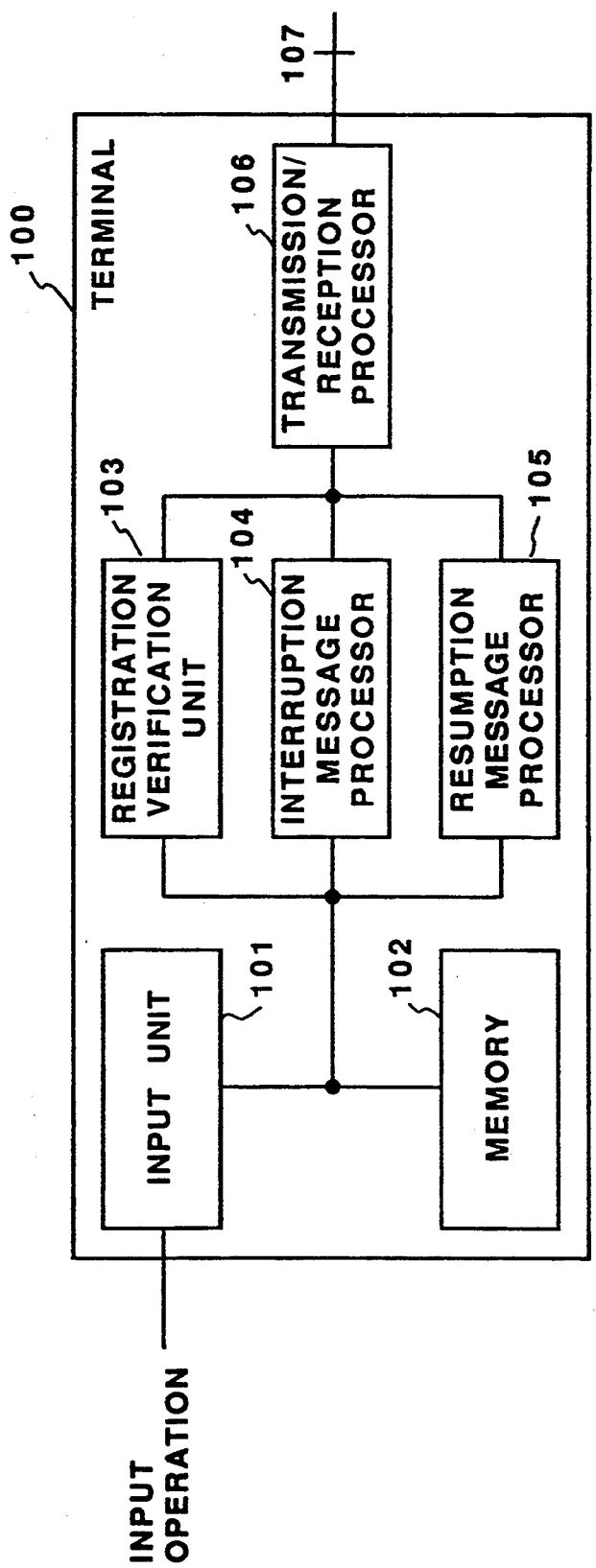
FIG. 1A is a functional block diagram illustrating the terminal of a private branch exchange system according to a first embodiment of the present invention.
Figure 1B:
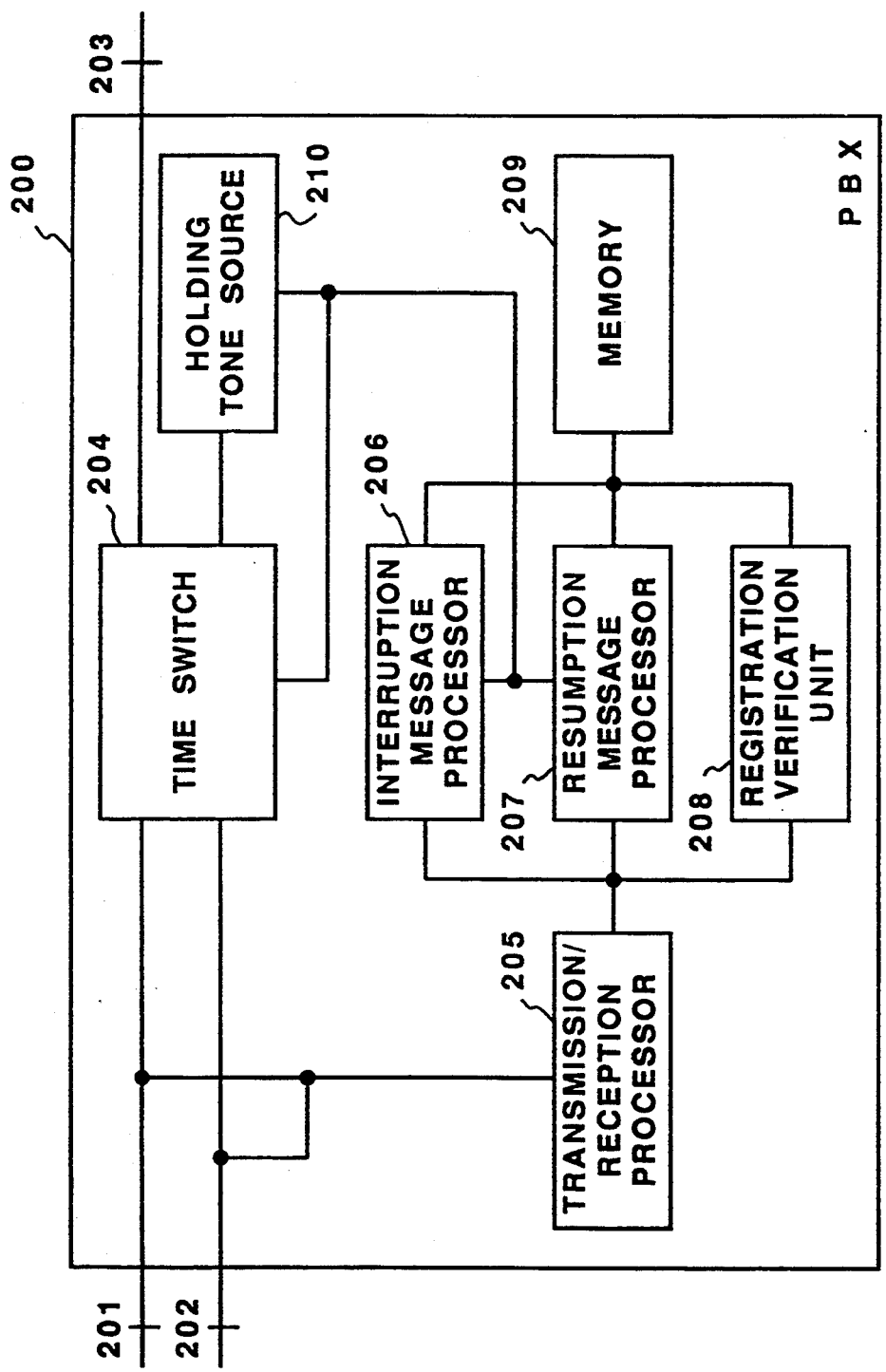
FIG. 1B is a functional block diagram illustrating a private branch exchange apparatus according to the first embodiment.
Figure 4:
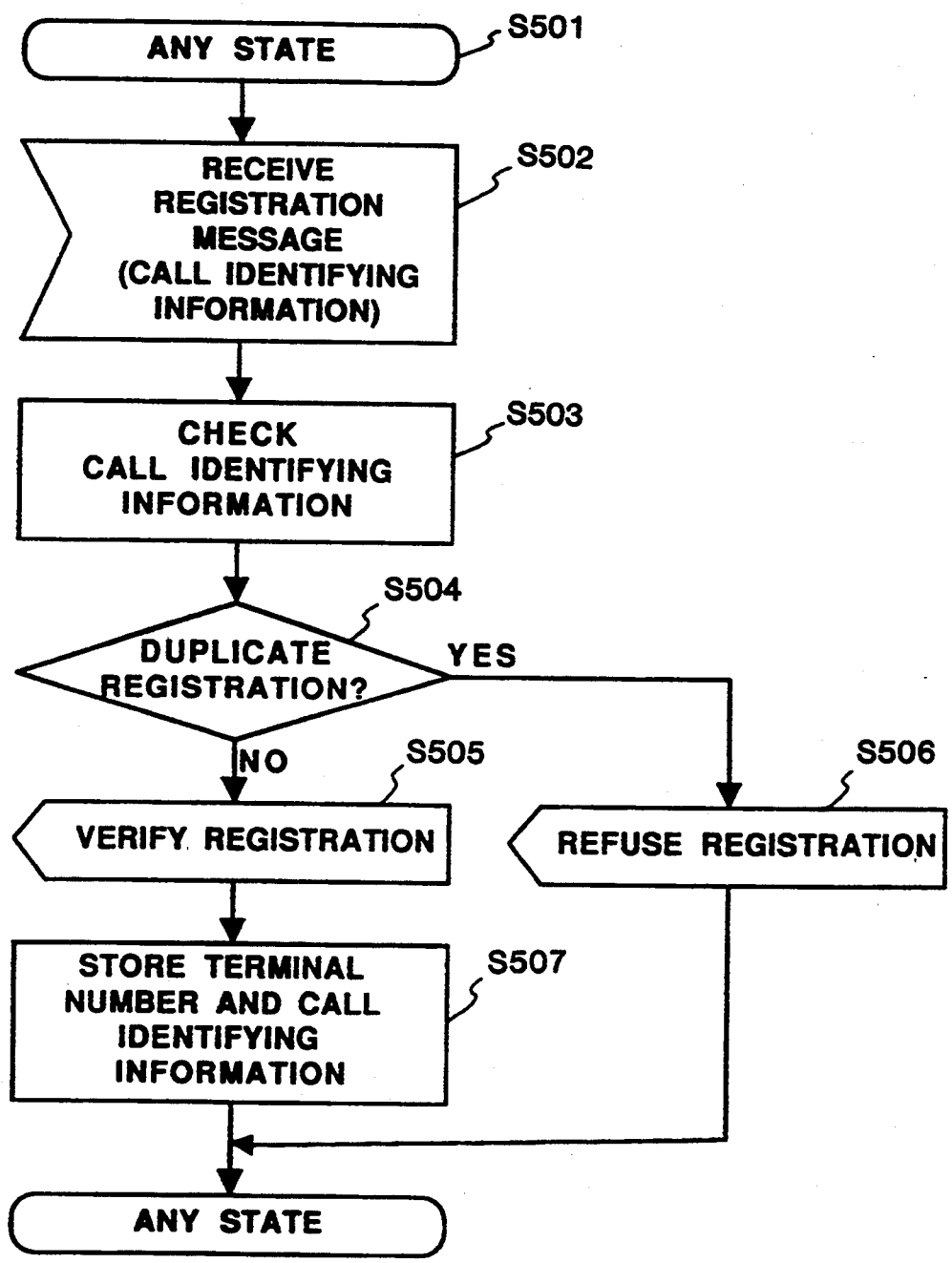
FIG. 4 is a flowchart illustrating the operation of call identifying information management in the private branch exchange apparatus according to the first embodiment.
Figure 5:
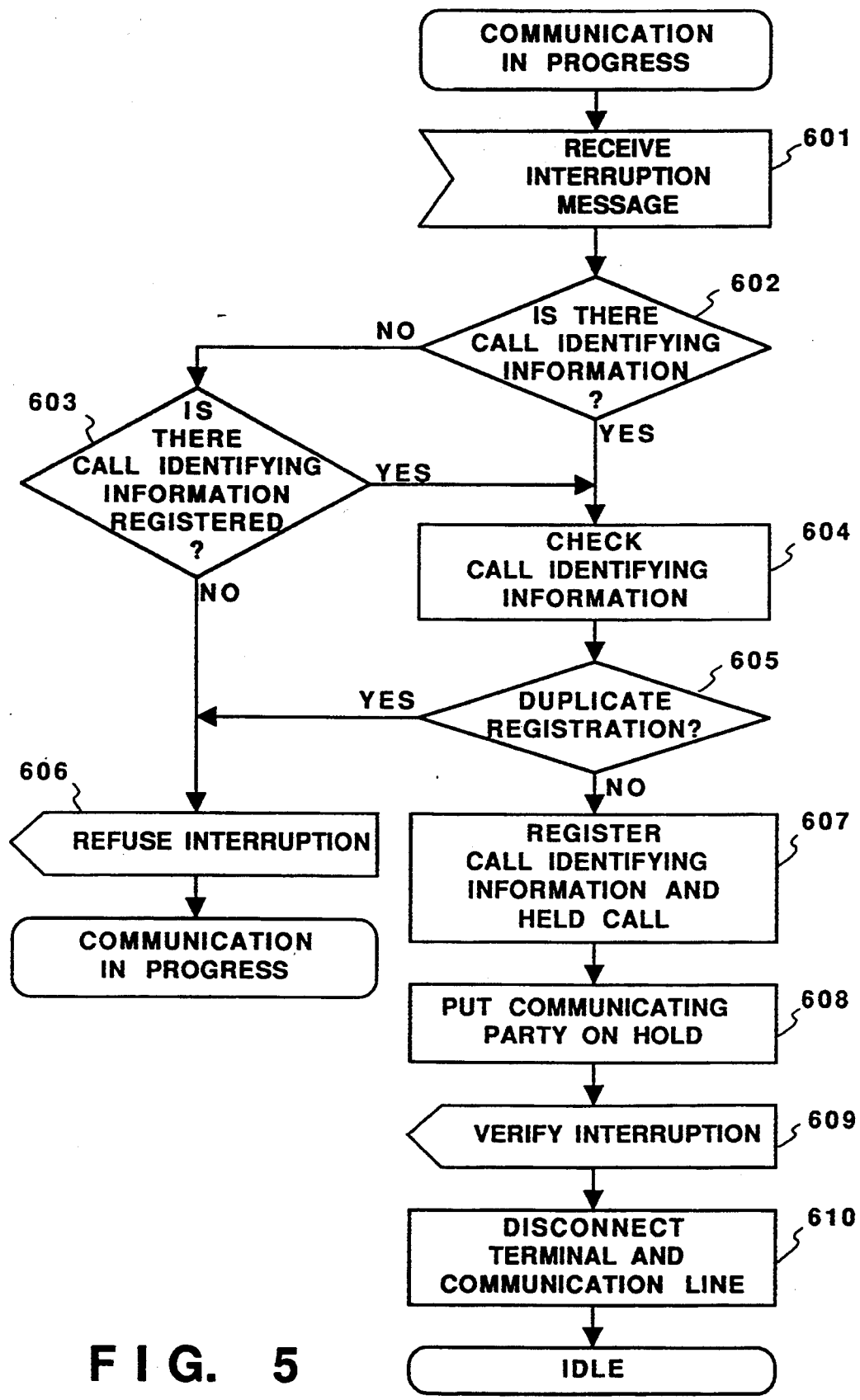
FIG. 5 is a flowchart illustrating interruption message processing in the private branch exchange apparatus according to the first embodiment.
Figure 6:
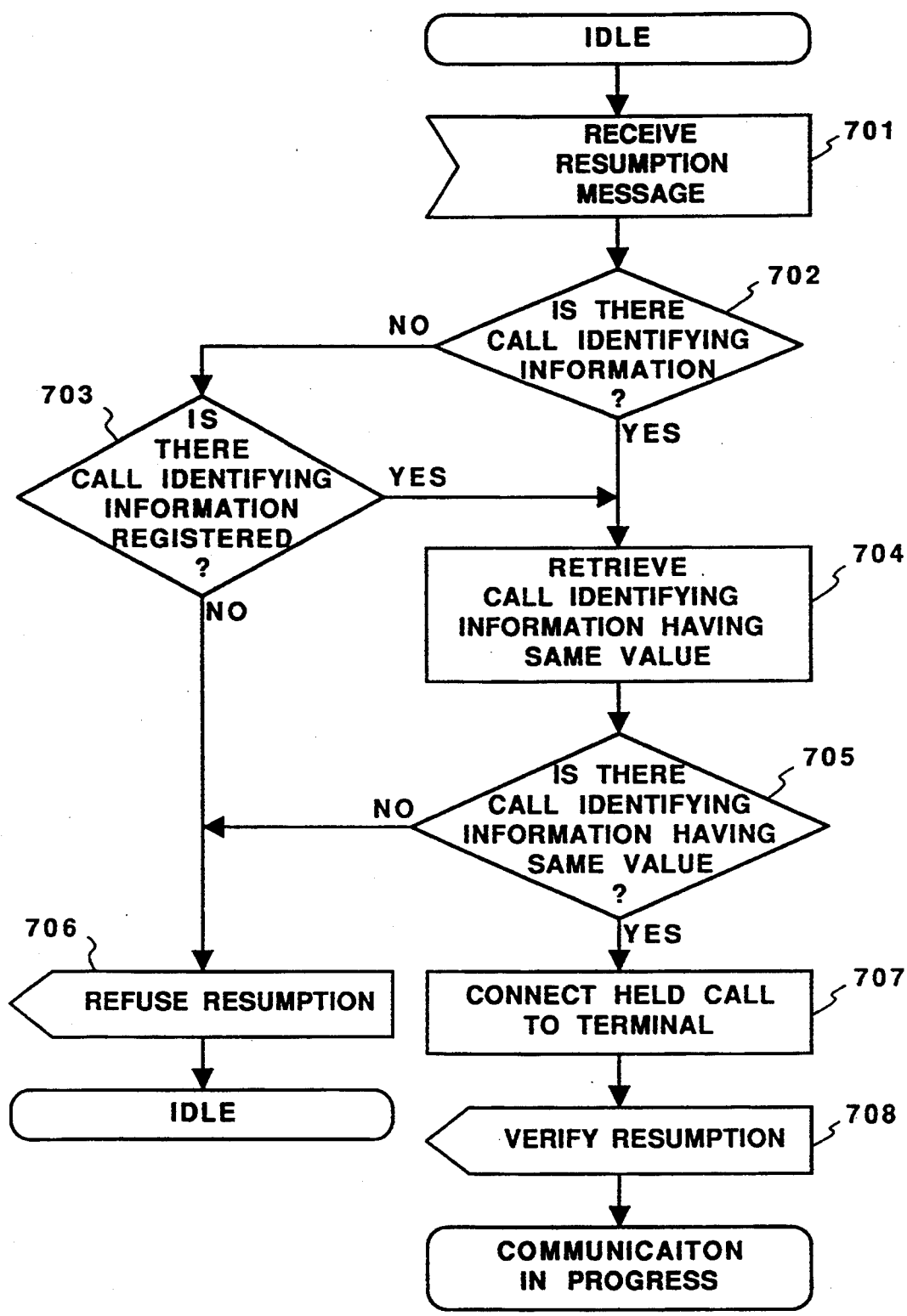
FIG. 6 is a flowchart illustrating resumption message processing in the private branch exchange apparatus according to the first embodiment.

A first embodiment of the present invention will now be described with reference to the drawings. FIG. 1A is a functional block diagram illustrating a terminal constituting a private branch exchange system according to the first embodiment, FIG. 1B is a functional block diagram illustrating a private branch exchange apparatus constituting the private branch exchange system according to the first embodiment, FIG. 2 is a diagram describing a terminal management table of a memory 209 in FIG. 1B, FIG. 3 is a diagram for describing a held-call management table of the memory 209, FIG. 4 is a flowchart describing operation in a case where the private branch exchange of FIG. 1B manages call identifying information, FIG. 5 is a flowchart for describing operation in a case where the private branch exchange of FIG. 1B processes an interruption message, and FIG. 6 is a flowchart for describing operation in a case where the private branch exchange of FIG. 1B processes a resumption message.

This private branch exchange system is constituted by a private branch apparatus (hereinafter referred to as a "PBX") 200, of the kind shown in FIG. 1B, which accommodates a plurality of terminals 100 of the type illustrated in FIG. 1A. The terminal 100 has an input unit 101 for carrying out various input operations, a memory 102 for storing the number of the terminal 100 as well as call identifying information, a registration verification unit 103 for registering the call identifying information in the memory 102 and verifying the information, an interruption message processor 104 for processing an interruption message when the terminal is moved, a resumption message processor 105 for processing a resumption message when the terminal is moved, and a sending/receiving processor 106 for processing transmission/reception of various messages. The latter is connected to the PBX 200 via the S-point interface 107.

The PBX 200 accommodates a plurality of terminals via S-point interfaces 201, 202. For example, the S-point interface 201 is connected to the S-point interface 107 shown in FIG. 1A. The PBX 200 is connected to an ISDN (not shown) via a T-point interface 203.

The PBX 200 has a time switch unit 204 for switching, in time-shared fashion, a communication line between the terminal 100 and the ISDN, as well as the communication channel between terminals 100, a transmission/reception processor 205 for processing the transmission/reception of various messages, an interruption message processor 206 for processing an interruption message when a terminal is moved, a resumption message processor 207 for processing a resumption message when the terminal is moved, a registration verification unit 208 for registering and verifying call identifying information, a memory 209 for storing the terminal number of each terminal as well as call identifying information and the numbers of calls on hold, and a holding tone source 210 for outputting a holding tone.

Upon receiving a registration message, interruption message and resumption message from the terminal 100, the transmission/reception processor 205 sends these messages to the registration verification unit 208, interruption message processor 206 and resumption message processor 207, respectively. The registration verification unit 208, interruption message processor 206 and resumption message processor 207 execute processing of the kind illustrated in FIGS. 4, 5 and 6, respectively, based upon these messages.

The memory 209 of the PBX 200 has a terminal management table for storing call identifying information for each terminal number, as shown in FIG. 2, as well as a held-call management table for storing calls on hold, namely the numbers of communicating parties, for each item of call identifying information of a terminal whose communication is currently being interrupted, as shown in FIG. 3. The registration of this call identifying information usually is in accordance with an initial setting which prevails when each terminal 100 is initially connected to the S-point interface 107. In this embodiment, however, the information is registered in any state. Further, the call identifying information is stored in the same fashion in the memory 102 of terminal 100. It should be noted that the reason why the registration verification unit 208 of the PBX 200 verifies the call identifying information is to prevent redundant registration of the same call identifying information.

The operation of the terminal 100 will be described with reference to FIG. 1A. In a case where the input unit 101 has analyzed an inputted operation request and has identified the registration of call identifying information, it notifies the registration verification unit 103 of the registration designation. It should be noted that this call identifying information can employ a specific number series "12345" character string "BCDE" or a combination thereof such as "6789A".

The registration verification unit 103 assembles a predetermined registration message from the call identifying information received and the terminal number stored in the memory 102, and sends this message to the transmission/reception processor 106. It should be noted that the registration message may use a layer-3 message (INFO message) defined in Standard Q.931 of the CCITT, or an independent layer-3 message, by way of example.

When the transmission/reception processor 106 sends this registration message to the S-point interface 107, the transmission/reception processor 205 of the PBX 200 receives the registration message via the S-point interface 200, discriminates the type of the received message and sends the registration message to the registration verification unit 208.

Operation in a case where the PBX 200 manages call identifying information, particularly operation of the registration verification unit 208, is described with reference to FIG. 4. When, starting from any state (step S501), a registration message from the terminal 100 is received at step S502, the call identifying information in the registration message and the call identifying information in the terminal management table shown in FIG. 2 are compared, whereby a check for duplicate registration is performed at step 503.

If duplicate registration has not occurred, a registration verification message is sent to the terminal 100 via the transmission/reception processor 205 (steps S504, S505). The terminal number of the terminal 100 and the call identifying information are correlated and stored in the terminal management table at step S507. The program then returns to the arbitrary state. If duplicate registration has occurred, however, a registration refusal message is sent to the terminal 100 via the transmission/reception processor 205 (steps S504, S506), and the program returns to the arbitrary state.

The registration verification unit 103 of the terminal 100 registers the call identifying information, inputted via the input unit 101, in the memory 102 when it is received as a registration verification message, but does not register this information when it is received as the registration refusal message. In a case where the terminal 100, which has stored its own call identifying information, is moved from the S-point interface 201 of the PBX 200 to the S-point interface 202, the input unit 101 accepts an interruption message transmission request before the terminal is disconnected from the S-point interface 201, whereupon the interruption message processor 104 reads the terminal number and the call identifying information out of the memory 102. The interruption message processor 104 assembles an interruption message containing the number and the call identifying information element, and the transmission/reception processor 106 transmits this interruption message to the PBX 200.

Next, operation in a case where the above-mentioned interruption message is processed by the PBX 200, particularly operation of the interruption message processor 206, will be described with reference to FIG. 5. When the interruption message is received during communication (step 601), the interruption message processor 206 first verifies whether there is call identifying information in the interruption message (step 602). If the interruption message contains call identifying information, the program proceeds to step 604. If the interruption message does not contain call identifying information, on the other hand, it is determined whether call identifying information corresponding to the terminal number in the interruption message has been registered in the terminal management table (603). If it has been registered, the program proceeds to step 604. If it has not been registered, the program proceeds to step 606.

At steps 604 and 605, it is determined whether this call identifying information has been registered in duplicate in the terminal management table. If it has not, processing from step 607 onward is executed. In case of duplicate registration, however, the program proceeds to step 606, at which the interruption refusal message is transmitted to the terminal 100, after which the program returns to the communicating state.

If the call identifying information has not been registered in duplicate, the call identifying information and the number of call on hold stored in the terminal management table are registered in the held-call management table of FIG. 3 at step 607. Then, at step 608, the time switch 204 is controlled so as to connect the holding tone source 210 and the T-point interface 203 in order to place the call on hold, i.e., to transmit the holding tone to the party communicating with the terminal 100. Next, the interruption verification message is transmitted to the terminal 100 at step 609, and the communication line to the terminal 100 is disconnected at step 610 to establish the idle state.

By virtue of the above processing, the party communicating with the terminal 100 is put on hold, and therefore the communication line between the PBX 100 and the communicating party is maintained even though the terminal 100 has been physically disconnected from the S-point interface 201. Then, when the input unit 101 receives a resumption message transmission request after the terminal 100 has been moved from the S-point interface 201 to the S-point interface 202, the resumption message processor 105 reads the terminal number and the call identifying information out of the memory 102. The resumption message processor 105 assembles a resumption message, which contains the terminal number and the call identifying information element, and the transmission/reception processor 106 transmits this resumption message to the PBX 200 via the S-point interface after the move.

Operation in a case where the resumption message is processed by the PBX 200, particularly operation of the resumption message processor 207, will be described with reference to FIG. 6. When the resumption message from the terminal 100 is received (step 701) in the idle state, verification is performed to determine whether there is call identifying information in the resumption message (step 702). If the resumption message contains call identifying information, the program proceeds to step 704. If the resumption message does not contain call identifying information, on the other hand, it is determined whether call identifying information corresponding to the terminal number in the resumption message has been registered in the terminal management table (step 703). If it has been registered, the program proceeds to step 704. If it has not been registered, the program proceeds to step 706.

At step 704, the call identifying information contained in the resumption message or the call identifying information registered in the terminal management table is retrieved from the held-call management table shown in FIG. 3. If it is determined in step 705 that the items of call identifying information have identical values, processing from step 707 onward is executed; otherwise, the program proceeds to step 706, at which a resumption refusal message is transmitted to the terminal 100 and the program returns to the idle state.

If an item of call identifying information having the same value exists in the held-call management table, the holding tone source 210 is disconnected from the time switch 204 and the time switch 204 is controlled at step 707 so as to connect the T-point interface 203 and the S-point interface 202 which is the destination of terminal movement. The resumption verification is message is then transmitted to the terminal 100 at step 708 and the communicating state is established.

<Modification>

Figure 7:
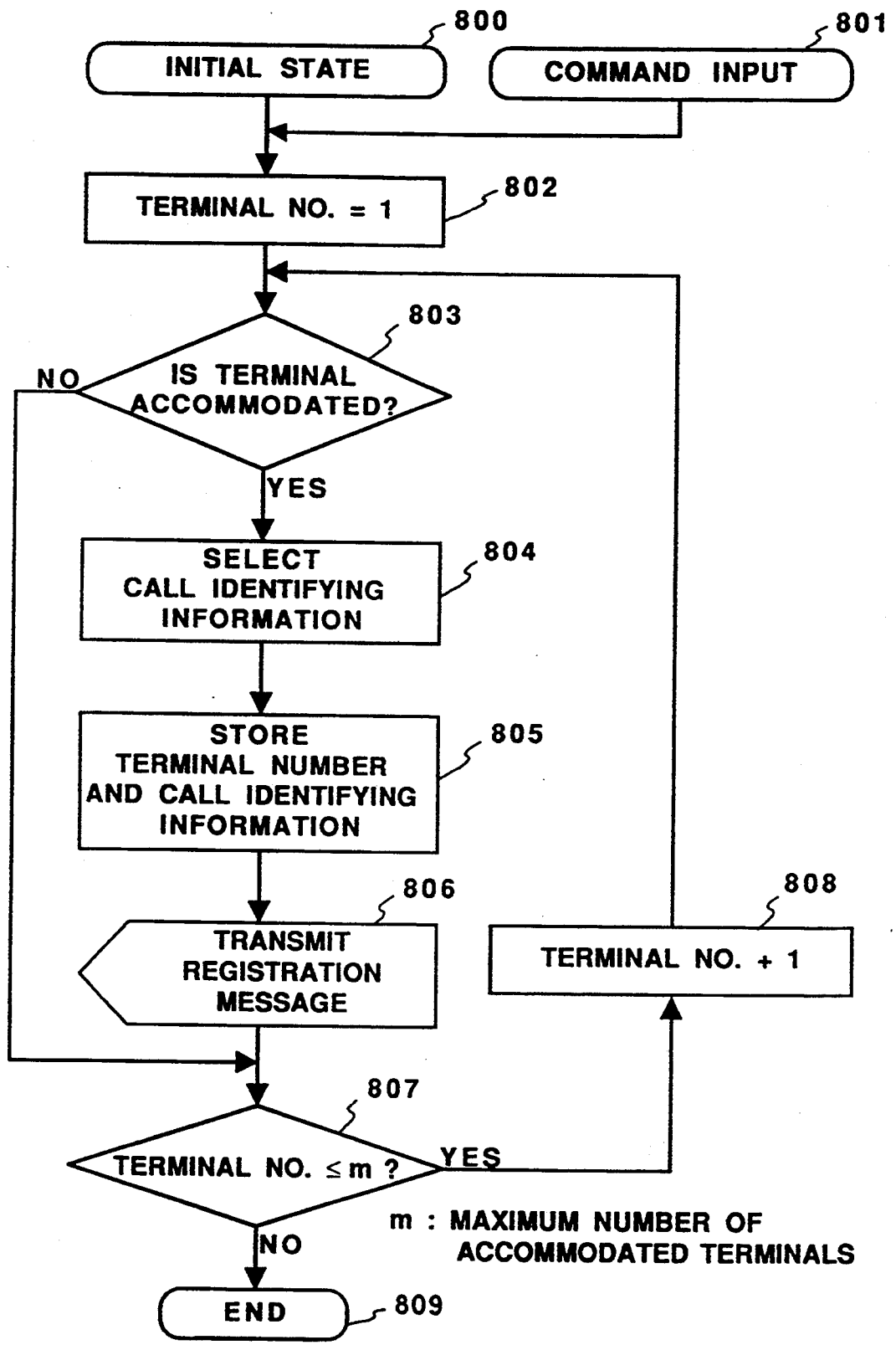
FIG. 7 is a flowchart illustrating the operation of call identifying information management in a private branch exchange apparatus according to an embodiment of the first embodiment.

A modification of the foregoing embodiment will now be described. FIG. 7 is a flowchart for describing operation in a case where the private branch exchange apparatus manages call identifying information in the private branch exchange system of this modification. Since the private branch exchange system of this modification has the same construction as that of the foregoing embodiment, a description thereof is omitted. In this modification, however, the terminal does not possess the registration verification unit 103 of the kind shown in FIG. 1A. Instead, it is so arranged that the function thereof implemented by the registration verification unit 208 of the PBX 200.

In FIG. 7, processing for registering the call identifying information of each terminal accommodated by the PBX is started at initial system start-up (step 800) or when a command for registering call identifying information is inputted (step 801). First, the terminal number is initialized to "1" at step 802. Next, it is determined at step 803 whether the PBX is accommodating a terminal having this number. If the PBX is accommodating this terminal, then processing from step 804 onward is executed; otherwise, the program jumps to step 807.

If the PBX is accommodating the terminal, call identifying information is selected at step 804 so as to avoid duplication, and then the above-mentioned terminal number and this call identifying information are stored in the terminal management table of FIG. 2 at step 805. Next, a registration message containing this terminal number and call identifying information is transmitted to this terminal at step 806. This is followed by step 807, at which it is determined whether the terminal number is equal to or less than a number m of maximum accommodated terminals in the system. If the terminal number is equal to or less than m, the terminal number is incremented at step 808 and processing from step 803 onward is executed for each and every terminal.

Thus, there are provided a terminal management table for storing call identifying information for each terminal number, and a held-call management table for storing the number of a held call for each item of call identifying information of terminals whose communication is currently being interrupted. When the call identifying information in a resumption message has been stored in the held-call management table, the communication line between held call and the terminal is connected. As a result, the terminal can be moved between different digital communication lines. This makes it possible to prevent loss of important communication.

<Second Embodiment>

Figure 8:
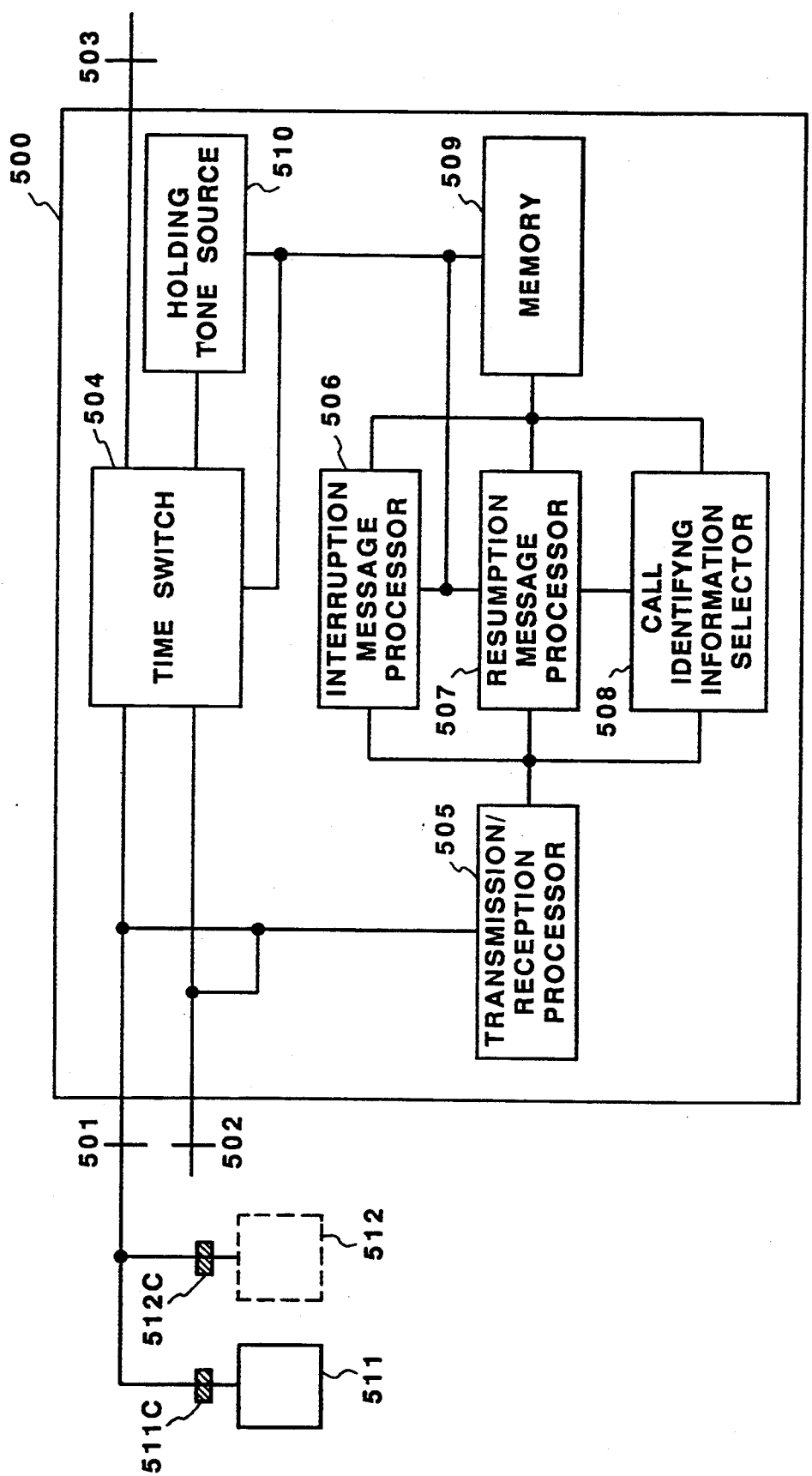
FIG. 8 is a functional block diagram illustrating a private branch exchange apparatus according to a second embodiment.

FIG. 8 is a functional block diagram illustrating a private branch exchange apparatus according to a second embodiment. Numeral 500 denotes the main body of a private branch exchange apparatus, and numerals 501, 502 designate S-point interfaces. The private branch exchange apparatus 500 is connected to a terminal 511 via the S-point interface 501. Similarly, number 512 denotes a terminal capable of being connected to the S-point interface 501. Numeral 503 denotes a T-point interface, which is the point of contact between the private branch exchange 500 and an ISDN. The private branch exchange 500 has a time switch unit 504 for switching the communication line in time-shared fashion, a transmission/reception processor 505 for processing the transmission/reception of various messages, an interruption message processor 506 for performing processing relating to an interruption message, a resumption message processor 507 for performing processing relating to an a resumption message, a call identifying information selecting unit 508 for selecting call identifying information and executing processing, a memory 509 for storing call identifying information, the number of held calls, etc., and a holding tone source 510 for transmitting a holding tone.

In a case where the terminal 511 is moved from a modular jack (connector) 511C to another modular jack 512C by a communication-equipment move, the interruption message is transmitted to the PBX 500. The interruption message received by the PBX 500 is processed by the interruption message processor 506 via the transmission/reception processor 505.

Figure 9B:
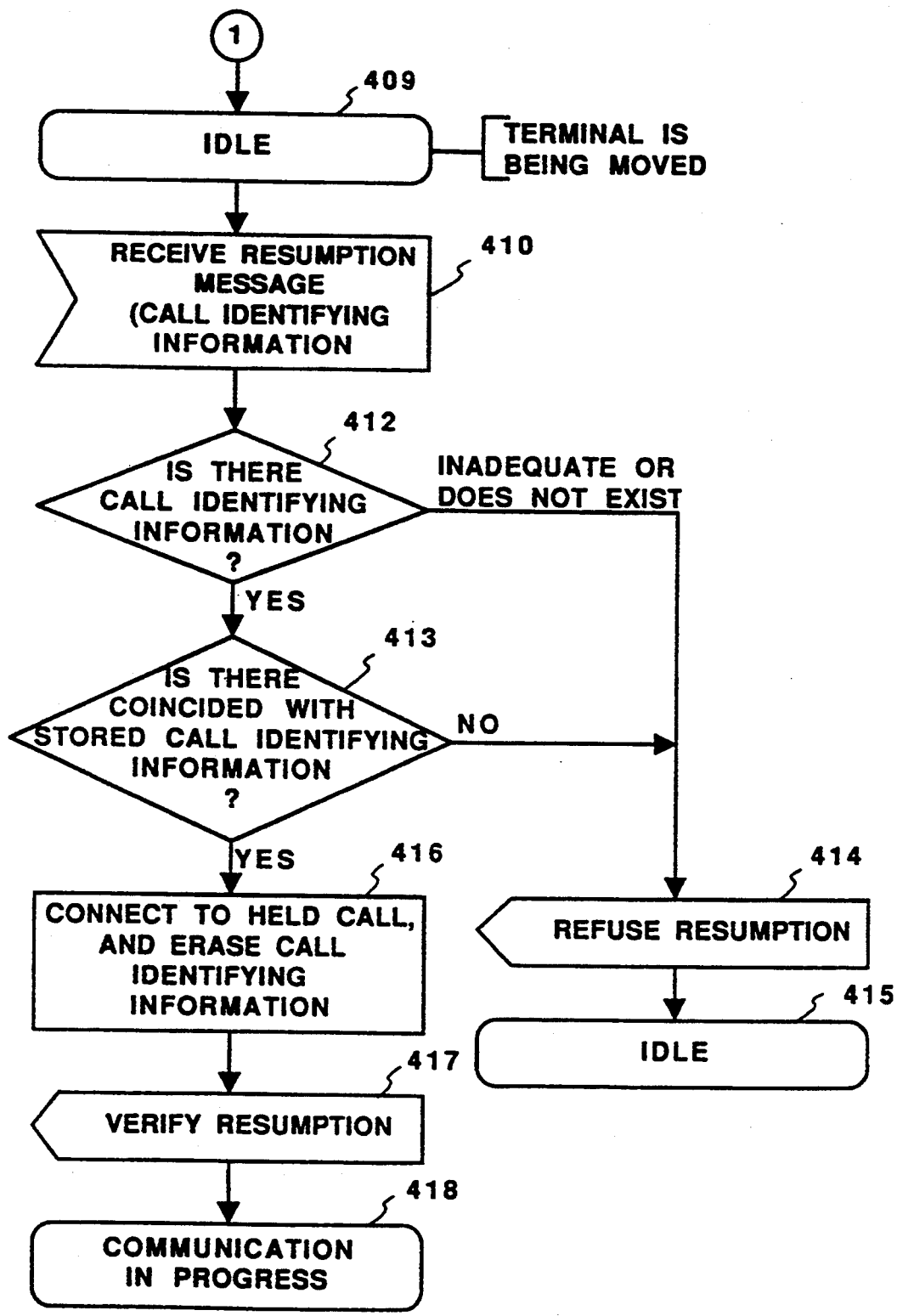
Figure 12:
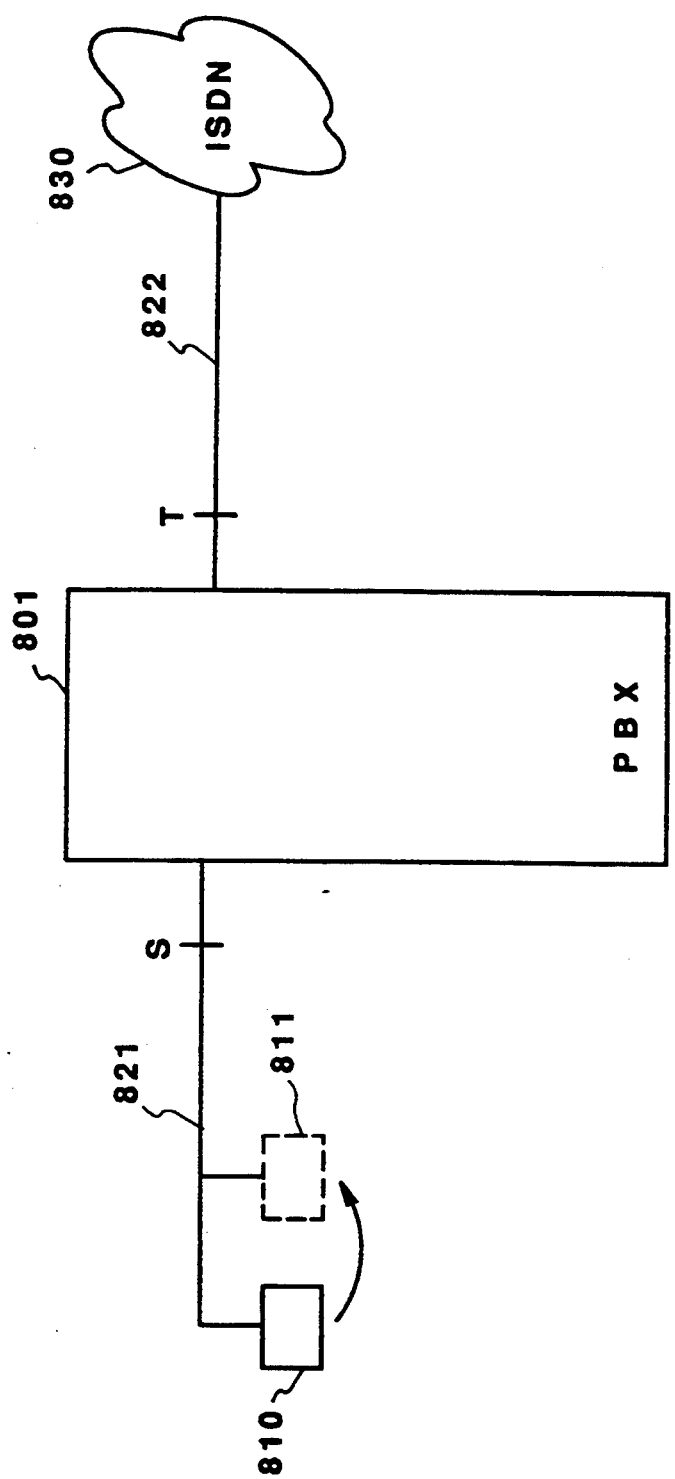
FIG. 12 is a diagram showing a common network using an ISDN.
Figure 13:
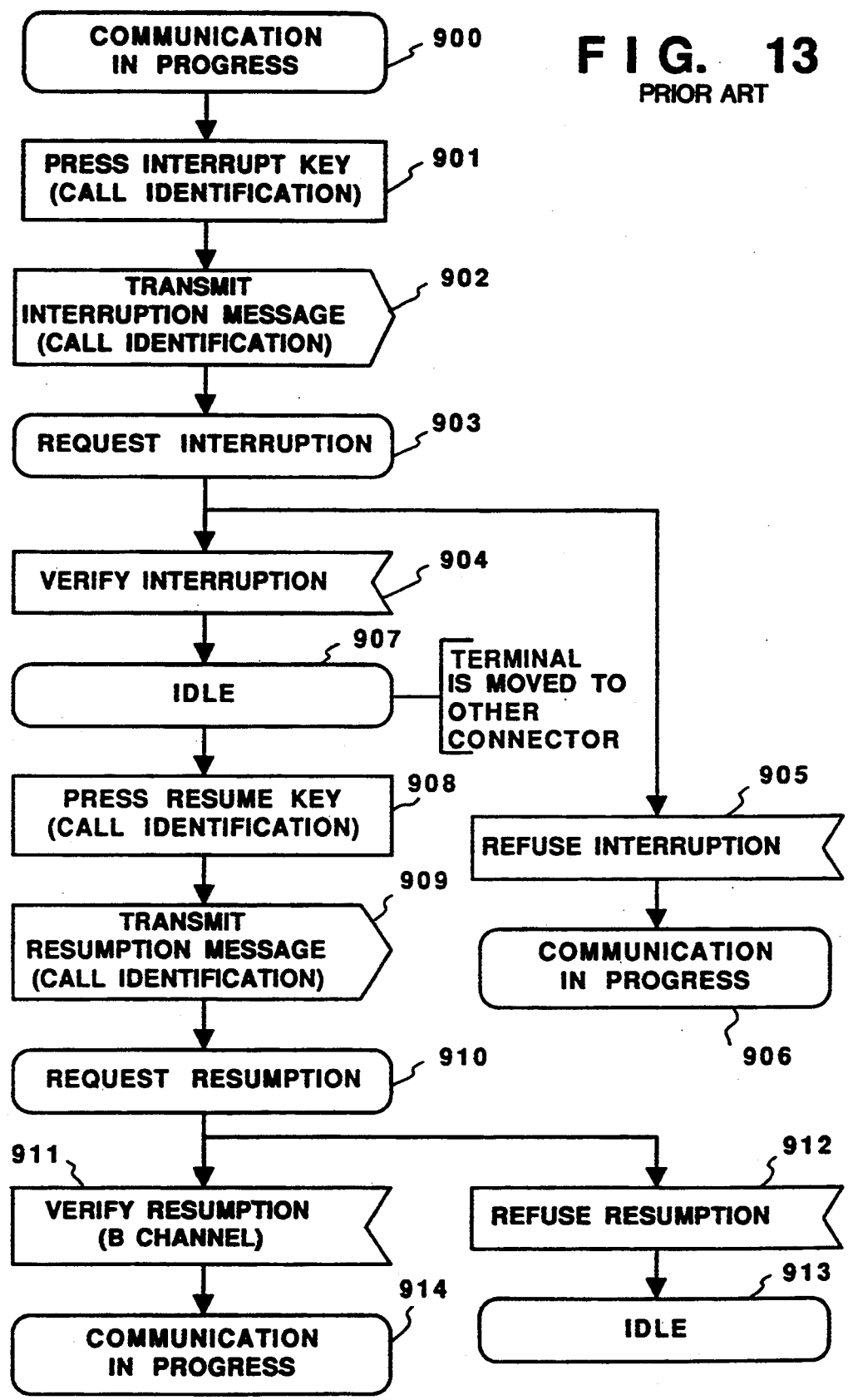
FIG. 13 is a flowchart illustrating an interruption/resumption sequence of a terminal shown in FIG. 12.
Figure 14:
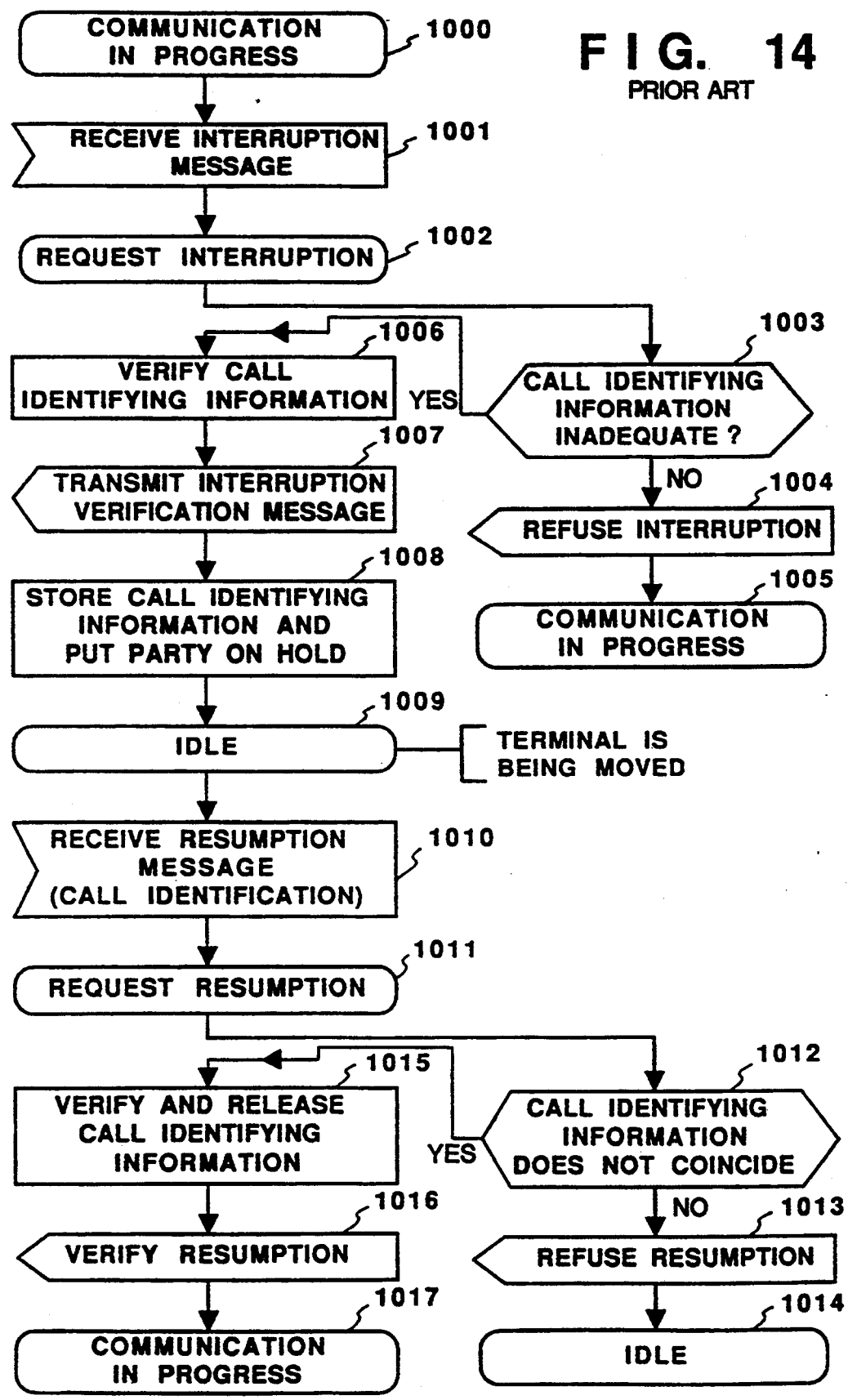
FIG. 14 is a flowchart illustrating an interruption/resumption sequence of a PBX shown in FIG. 12.

FIGS. 9A, 9B illustrate the interruption/resumption sequence of the PBX 500.

Steps 400 through 408 in FIG. 9A illustrate the flow of interruption message processing by the interruption message processor 506 in the PBX 500. When the interruption message processor 506 receives the interruption message sent from the terminal 511 (step 401), it performs verification to determine whether there is a call identifying information element (shown in FIG. 11(a)) in the interruption message (step 403). When the message contains the call identifying information element, the processor 506 checks a held-call management table of the kind shown in FIG. 10 and determines whether there are held calls based upon identical call identifying information on the same interface. As shown in FIG. 10, call identifying information of a call for which the interruption service has been actuated, as well as the number of the held call corresponding to this call identifying information, is recorded in the held-call management table. When items of call identifying information having identical values are present in the held-call management table, this means a double hold and a determination is made to the effect that the interruption service is incapable of being applied, namely that the call identifying information is inadequate. The interruption message processor 506 transmits the interruption refusal message to the terminal 511 via the transmission/reception processor 505 at step 404 and communication is established at step 405.

In a case where the held-call management table does not have call identifying information possessing identical values, the program proceeds to step 407, at which the memory 509 is instructed to register the call identifying information and the number of held call in the held-call management table of FIG. 10. At the same time, in order to send the holding tone to the party (whose call has been put on hold) communicating with the terminal 511, the T-point interface 503 is connected to the holding tone source 510 via the time switch 504. Next, the interruption message processor 506 transmits the interruption verification message to the terminal 511 via the transmission/reception processor 505 and instructs the time switch 504 to disconnect the interface of the terminal 511 at step 408. By virtue of the foregoing processing, the interruption of the call is completed and the terminal 511 is physically disconnected from the S-point interface 501, namely from the modular jack 511C.

In a case where the call identifying information element is not contained in the interruption message ("DOES NOT EXIST" at step 403 in FIG. 9A), the processing of step 406 is executed. Specifically, (i) the interruption message processor 506 requests the call identifying information selecting unit 508 to select the call identifying information and connects the T-point interface 503 to the holding tone source 510 via the time switch 504 to send the holding tone to the party (whose call has been put on hold) communicating with the terminal 511. Next, (ii) the call identifying information selecting unit 508 checks the held-call management table of FIG. 10, selects call identifying information in such a manner that held calls based upon identical call identifying information will not be present on the same interface, and instructs the memory 509 to register the selected call identifying information and the number of the held call in the held-call management table.

Next, the program proceeds to step 408, at which (i) the call identifying information selecting unit 508 transmits the selected call identifying information to the interruption message processor 506 and requests transmission of the interruption verification message. Then, (ii) the interruption message processor 506 processes the selected call identifying information to the display information element shown in FIG. 11(b), instructs the transmission/reception processor 505 to place this element in the interruption verification message and transmit the message, and sends the time switch 504 a command to disconnect the interface of the terminal 511.

When the interruption verification message is received, the terminal 511 attains the idle state (step 409 of FIG. 9B). At this time, the display information element is interpreted in the terminal 511, the contents thereof (the call identifying information) are displayed on a display device (not shown) to notify the person moving the terminal.

In a case where the terminal 511 is moved to a different modular jack 512C and communication with the held call is resumed, a resumption message is transmitted to the PBX 500.

Steps 410 through 418 in FIG. 9B represent the flow of resumption message processing executed by the resumption message processor 507 of the PBX 500. Upon receiving the resumption message (step 410), the resumption message processor 507 verifies whether the message contains call identifying information (step 412). If the message does not contain call identifying information, or if the information is inadequate, the resumption service is incapable of being applied. Therefore, the resumption message processor 507 transmits the resumption refusal message to the terminal 511 via the transmission/reception processor 505, and the idle state is attained (steps 414, 415).

If the resumption message contains call identifying information, reference is made to the held-call management table and a search is made for call identifying information having the same value on the same interface (step 413). If call identifying information having the same value is not present in the held-call management table, this means that the resumption service is incapable of being applied. Accordingly, the resumption message processor 507 transmits the resumption refusal message to the terminal 511 via the transmission/reception processor 505, and the idle state is attained (steps 414, 415).

On the other hand, if call identifying information having the same value exists ("YES" at step 413), the program proceeds to step 416, where the number of the held call is extracted from the held-call management table of FIG. 10. In order to connect the held call to the terminal 511, the time switch 504 is instructed to connect the S-point interface 501 on the side of the terminal 511 and the T-point interface 503 on the side of the held call. At this time the call identifying information and the number of the held call are deleted from the held-call management table.

Next, the resumption message processor 507 transmits the resumption verification message to the terminal 511 via the transmission/reception processor 505 (step 417) so that the terminal 511 and the held call are placed in communication again (step 418).

In the foregoing embodiment, a case is described in which a terminal is moved in the same interface. However, if the range over which reference is made to the held-call management table of FIG. 10 at steps 403 and 412 in FIGS. 9A, 9B is broadened to the entirety of the table and the call identifying information which the PBX 500 selects has uniqueness with regard to the entirety of the private branch exchange apparatus, then the PBX 500 will be capable of executing the required processing even if the resumption operation for the terminal 511 is performed at another interface. The term "has uniqueness" means that two or more identical interfaces, or two or more items of call identifying information with regard to the entire private branch exchange apparatus, do not exist.

Thus, as described above, if an interruption message sent from a terminal to a private branch exchange apparatus does not contain call identifying information, then call identifying information having uniqueness with regard to one interface or the entirety of the private branch exchange apparatus is selected, and this call identifying information is added to an interruption verification message, thereby notifying the terminal (the person moving the communications equipment). As a result, the duplication of call identifying information is prevented, and a service for moving communications equipment (a terminal) can be provided without limiting the number of calls that can be interrupted simultaneously, even if there is no input of call identifying information. This makes it less troublesome for the person to move the equipment. In addition, in a case where the private branch is equipped with a plurality of S-point interfaces, a service for moving equipment in communication can be provided not only between modular jacks of the same interface but also between different interfaces.

As many apparently widely different embodiments of the present invention can be made without departing from the spirit and scope thereof, it is to be understood that the invention is not limited to the specific embodiments thereof except as defined in the appended claims.

What is claimed is:

1. A private branch exchange system for interrupting and resuming communication of a terminal of the private branch exchange with another terminal over a transmission line, comprising:

means for interrupting a call of the private branch exchange terminal;
 selection means for selecting and storing call identifying information associated with the private branch exchange terminal in such a manner that a plurality of interrupted calls will not receive identical call identifying information by said selection means;
 means for informing the private branch exchange terminal of the call identifying information selected by said selection means;
 means for retrieving call identifying information designated by the private branch exchange terminal; and
 means for resuming one of the plurality of interrupted calls based on the call identifying information designated by the private branch exchange terminal.

2. The system according to claim 1, wherein when the private branch exchange terminal is informed of the call identifying information, said private branch exchange terminal is placed in an idle state and displays the contents of the call identifying information.

3. The system according to claim 1, further comprising means for comparing call identifying information in the selecting means with the call identifying information designated by the private branch exchange terminal and wherein if call identifying information having a value identical with the call identifying information designated by the private branch exchange terminal does not exist in the selection means, resumption of communication is refused.

4. A private branch exchange system, comprising:

reception means for receiving an interruption message and a resumption message transmitted from a terminal;
 interruption means for interrupting a call in communication when said reception means receives the interruption message; and
 storage means for storing a correspondence between call identifying information included in the interruption message and the call interrupted by said interruption means,
 wherein if the interruption message received by said reception means does not include call identifying information, said storage means stores a correspondence between a terminal number included in the interruption message and the interrupted call, and
 said interruption means resumes the interrupted call in accordance with either call identifying information included in the resumption message received by said reception means or a terminal number included in the resumption message and with the correspondence stored in said storage means.

5. The system according to claim 4, further comprising retrieval means for retrieving identifying information corresponding to the terminal number included in the interruption message received by said reception means,
 wherein said storage means stores a correspondence between the identifying information retrieved by said retrieval means and the interrupted call, if the interruption message received by said reception means does not include call identifying information.

6. The system according to claim 5, wherein said retrieval means further comprises second storage means for storing a correspondence between the terminal number and the identifying information.

7. The system according to claim 4, wherein said interruption means releases the call from interruption based upon the call identifying information included in the resumption message if the resumption message received by said reception means includes the call identifying information, and if the resumption message does not include the call identifying information, said interruption means releases the call from interruption based upon the terminal number included in the resumption message.

8. A call control method of an exchange system comprising the steps of:

receiving an interruption message from a terminal of the exchange system in communication;

selecting and storing call identifying information associated with the exchange system terminal in such a manner that said call identifying information does not coincide with call identifying information associated with other terminals based on the interruption message received in said receiving step;

interrupting a call of the exchange system;

informing the exchange system terminal of the call identifying information selected in said selecting step;

retrieving call identifying information designated by the exchange system terminal; and resuming one of the plurality of interrupted calls based on the call identifying information designated by the exchange system terminal.

9. The method according to claim 8, in which the terminal is informed of said call identifying information associated with the terminal so as to be displayed at the terminal.

* * * * *

UNITED STATES PATENT AND TRADEMARK OFFICE
CERTIFICATE OF CORRECTION

PATENT NO. : 5,410,591
DATED : April 25, 1995
INVENTOR(S) : Takumi Takahashi

It is certified that error appears in the above-indentified patent and that said Letters Patent is hereby corrected as shown below:

ON TITLE PAGE

In [56] References Cited, under FOREIGN PATENT DOCUMENTS:
"1319391  12/1989  Japan" should read
--1-319391  12/1989  Japan--.

COLUMN 1

Line 38, "such as" should read --an--.

COLUMN 2

Line 5, "side" should read --side of the--.
Line 45, "At" should read --The--.

COLUMN 3

Line 5, "0" should be deleted.

COLUMN 4

Line 16, "an embodiment of" should be deleted.

COLUMN 5

Line 67, ""12345"" should read --"12345",--.

COLUMN 6

Line 14, "interface 200" should read --interface 107--.
Line 26, "step 503." should read --step S503.--.

UNITED STATES PATENT AND TRADEMARK OFFICE
CERTIFICATE OF CORRECTION

PATENT NO.  : 5,410,591
DATED       : April 25, 1995
INVENTOR(S) : Takumi Takahashi It is certified that error appears in the above-indentified patent and that said Letters Patent is hereby corrected as shown below:

<u>COLUMN 7</u>

Line 3, "table (603)." should read --table (step 603).--.

<u>COLUMN 8</u>

Line 9, "is" should be deleted.
Line 25, "implemented" should read --is implemented--.

<u>COLUMN 9</u>

Line 36, "FIG. 11(a))" should read --FIG. 11A)--.

<u>COLUMN 10</u>

LIne 33, "FIG. 11(b)," should read --FIG. 11B,--.

Signed and Sealed this

Twenty-sixth Day of September, 1995

Attest:

BRUCE LEHMAN

Attesting Officer    Commissioner of Patents and Trademarks